Figure 1:
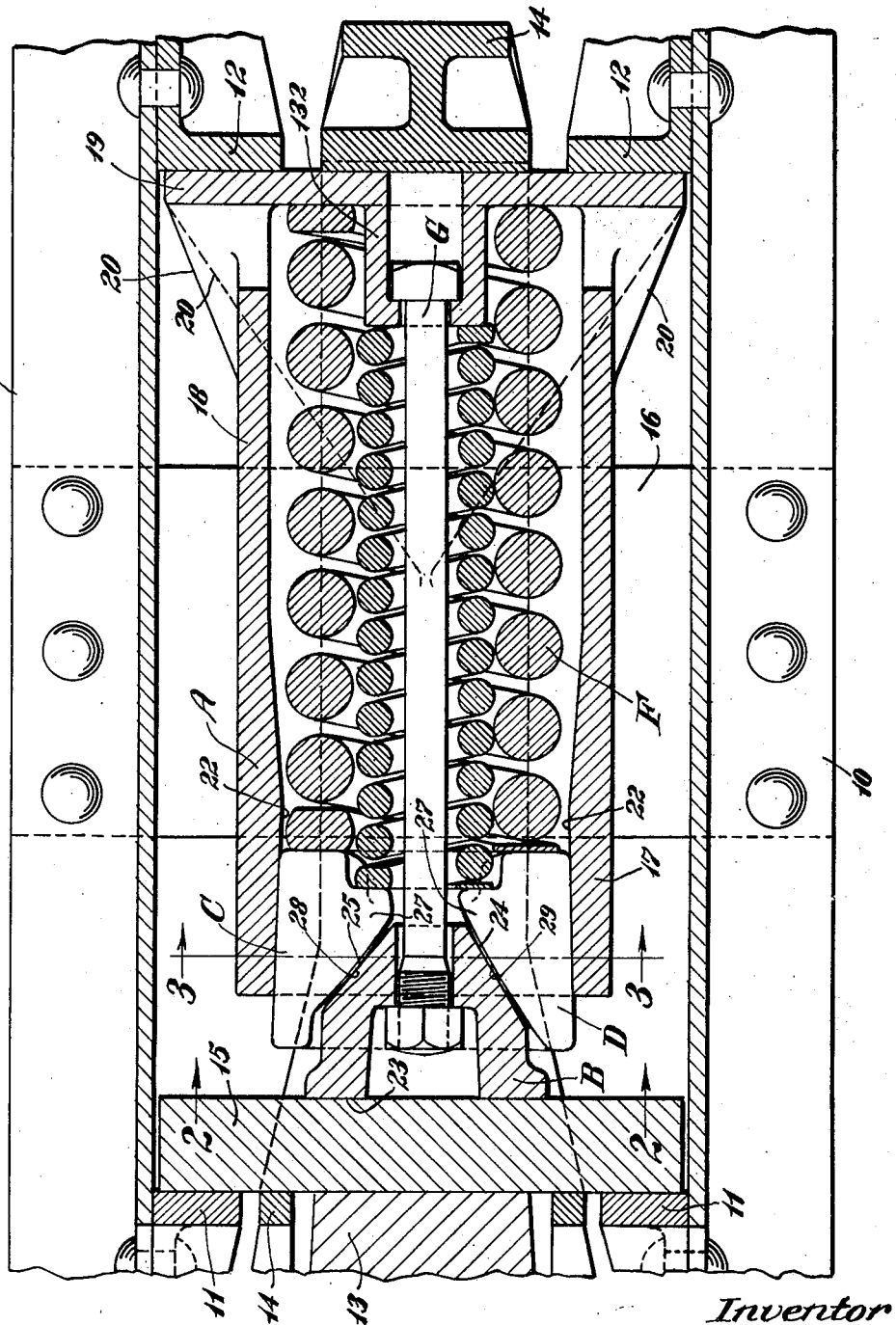

March 4, 1941.      R. J. OLANDER      2,233,636
FRICTION SHOCK ABSORBING MECHANISM
Filed Aug. 19, 1938      4 Sheets-Sheet 1

Inventor
Roland J. Olander
By Henry Fuchs,
Atty.

March 4, 1941.   R. J. OLANDER   2,233,636
FRICTION SHOCK ABSORBING MECHANISM
Filed Aug. 19, 1938   4 Sheets-Sheet 2
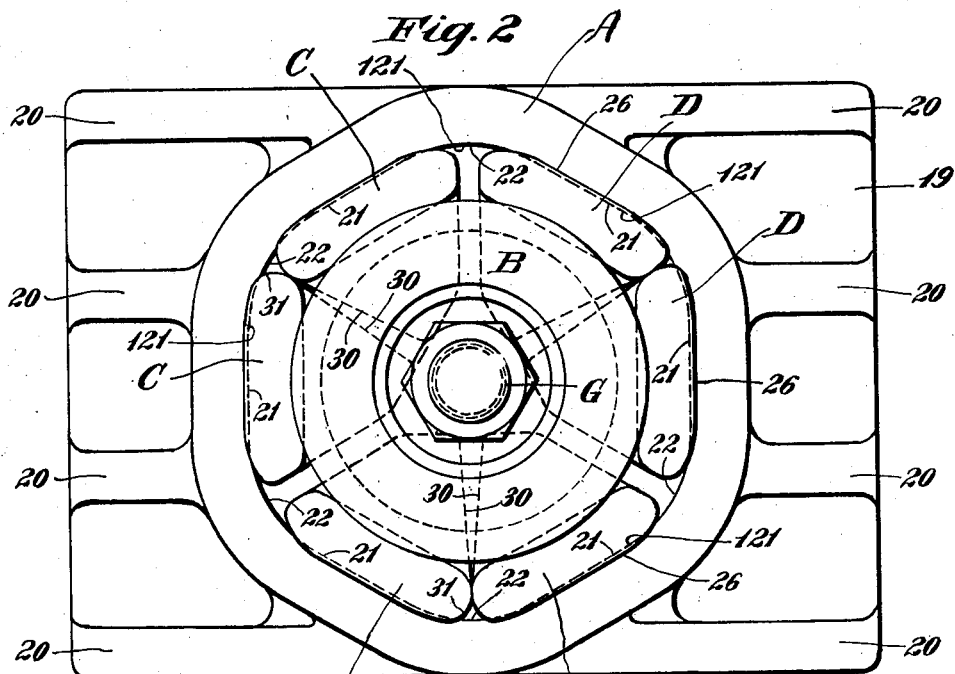
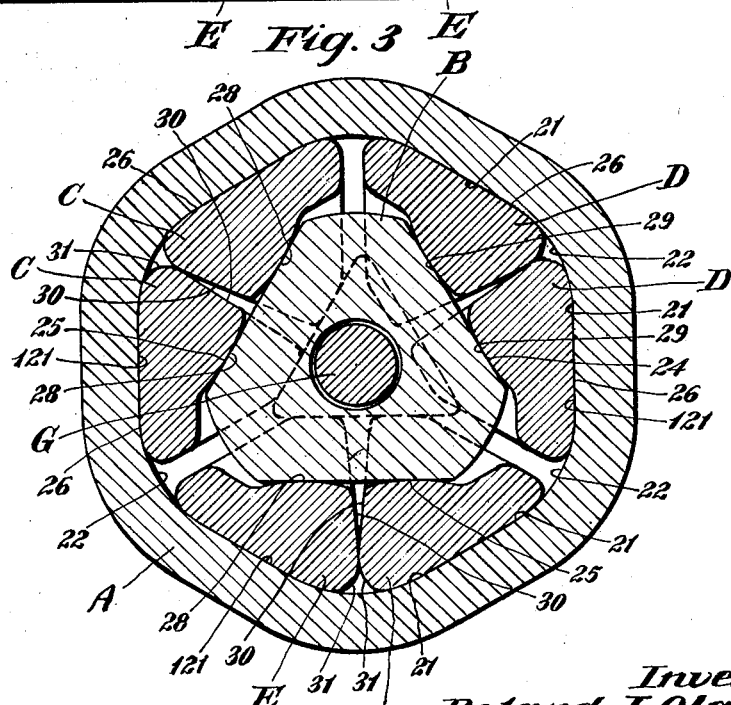
Inventor
Roland J. Olander
By Henry Fuchs.
Atty.

March 4, 1941.   R. J. OLANDER   2,233,636
FRICTION SHOCK ABSORBING MECHANISM
Filed Aug. 19, 1938   4 Sheets-Sheet 3

Inventor
Roland J. Olander
By Henry Fuchs
Atty.

March 4, 1941.    R. J. OLANDER    2,233,636
FRICTION SHOCK ABSORBING MECHANISM
Filed Aug. 19, 1938    4 Sheets-Sheet 4
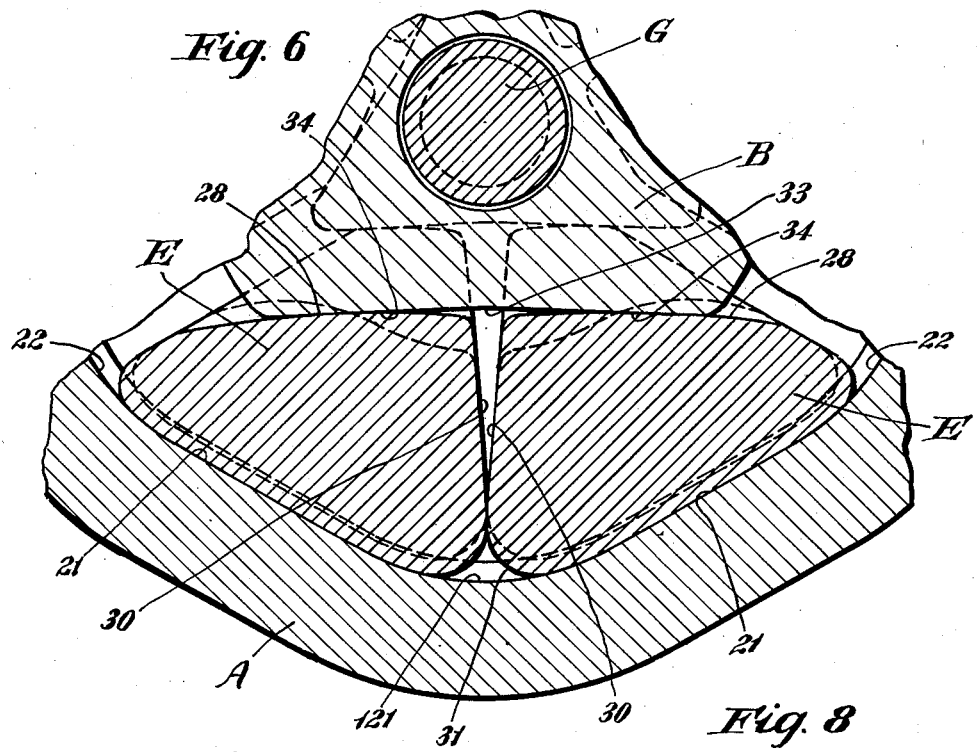
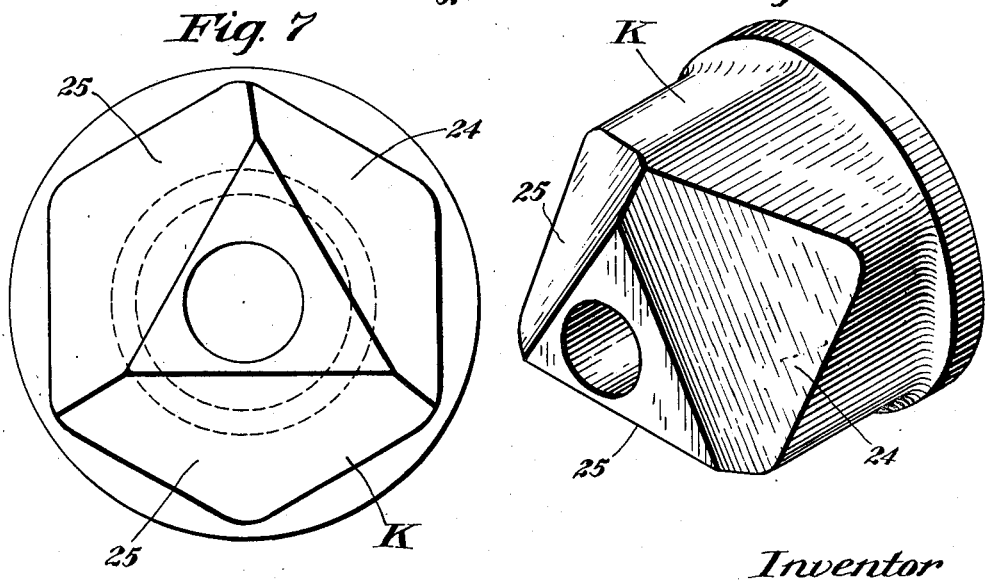
Inventor
Roland J. Olander
By Henry Fuchs.
Atty.

Patented Mar. 4, 1941

2,233,636

UNITED STATES PATENT OFFICE 2,233,636

FRICTION SHOCK ABSORBING MECHANISM

Roland J. Olander, Chicago, Ill., assignor to W. H. Miner, Inc., Chicago, Ill., a corporation of Delaware Application August 19, 1938, Serial No. 225,758

8 Claims. (Cl. 213—32)

This invention relates to improvements in friction shock absorbing mechanisms, and process of fitting parts.

More particularly the invention relates to such mechanisms wherein are employed a wedge friction system including a wedging means and a plurality of friction shoes coacting with a friction casing or shell of angular interior cross section.

As is well known to those skilled in this art, in the manufacture of shock absorbing mechanisms of the character indicated adapted for draft riggings, machine finishing operations are rarely resorted to, on account of the increased expense which would be involved. In those shock absorbing mechanisms employing a friction casing of angular cross section, a pressure transmitting wedge, and a plurality of friction shoes surrounding the wedge and cooperating with the friction surfaces of the casing or shell, it is the usual practice to make the shell in the form of a casting without any machine finishing operations, and to drop-forge the pressure transmitting wedge member and friction shoes, and in the case of the drop-forged wedge member and shoes, satsfactorily accurate results can be obtained. In the case of the interior of the casing, machining would be difficult and too expensive to receive practical consideration and consequently the accuracy of manufacture of the friction shell is dependent upon the moulding and casting without other appreciable finishing. In foundry operations, certains working variations must be allowed for in commercial practice.

As is further well known to those skilled in the art, in a friction device of the character indicated, it is essential that true full contact be had on all cooperating friction surfaces and also on the wedge faces. As is evident, due to the necessary foundry variations which must be permitted in commercial practice, the friction casings produced are not all of precisely the same interior cross sectional contour, with the result that, unless these conditions are in some way remedied, proper contact of all of the sets of surfaces just referred to cannot always positively be insured and the devices do not function as efficiently as they should.

One object of the invention is to provide a very simple expedient by which adjustments of the parts within limits of variations of cross sectional interior contour of the friction casings, necessitated by commercial manufacture, can be had to positively insure the proper contact of all the cooperating engaging sets of faces of the friction shock absorbing mechanisms.

A more specific object of the invention is to provide, in that type of friction shock absorbing mechanism having a friction casing of generally hexagonal, transverse, interior cross section, a central pressure transmitting wedge, and a plurality of friction shoes surrounding the wedge and interposed between the same and the casing walls, means for insuring flat surface contact between the pressure transmitting wedge and cooperating faces of the shoes while allowing for those variations in transverse angularity of the friction surfaces of the casing with respect to each other, which are necessitated by commercial practice.

Still another and more specific object of the invention is to provide a friction shock absorbing mechanism having a casing of hexagonal, interior, transverse cross section, a central wedge provided with three inwardly converging wedge faces arranged symmetrically about its longitudinal axis, and a plurality of friction shoes surrounding the wedge and interposed between the wedge faces thereof and the friction surfaces of the casing, wherein the friction shoes are adjustable with respect to each other and the wedge to compensate for deformities in contour of the casing allowable in commercial practice.

A further object of the invention is to provide a friction shock absorbing mechanism as set forth in the preceding paragraph, wherein the shoes are arranged in pairs, each pair having wedging engagement with one of the wedge faces of the wedge, and shoes of each pair forming, in effect, a split friction member, the parts of which are adjustable by rocking engagement with each other and the wedge to properly interfit with two adjacent angularly disposed friction surfaces of the hexagonal interior of the casing.

Yet another object of the invention is to provide a process or method by which the shoes of a friction shock absorbing mechanism of the character set forth, having a hexagonal friction casing, are properly fitted to the contour of the casing, and the contacting faces of the pressure transmitting wedge and shoes of said mechanism will be brought into true flat surface engagements with each other after a very few actuations after the parts have been assembled, whereby the permitted foundry variations allowed in commercial practice will be automatically compensated for.

Other objects of the invention will more clearly appear from the description and claims hereinafter following.

Figure 4:
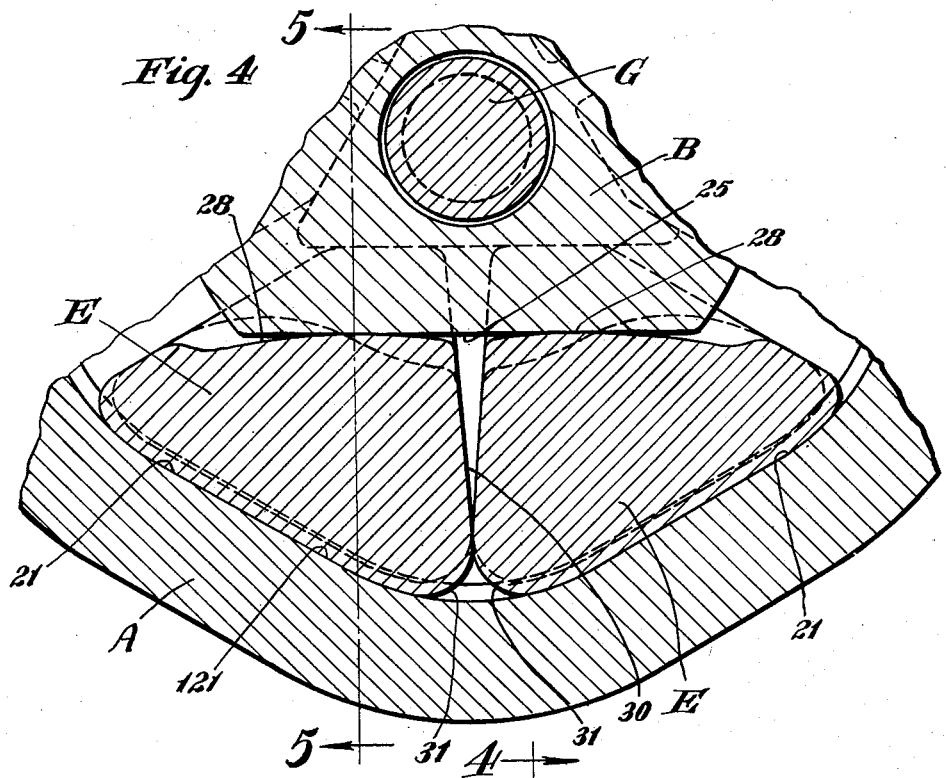
Figure 5:
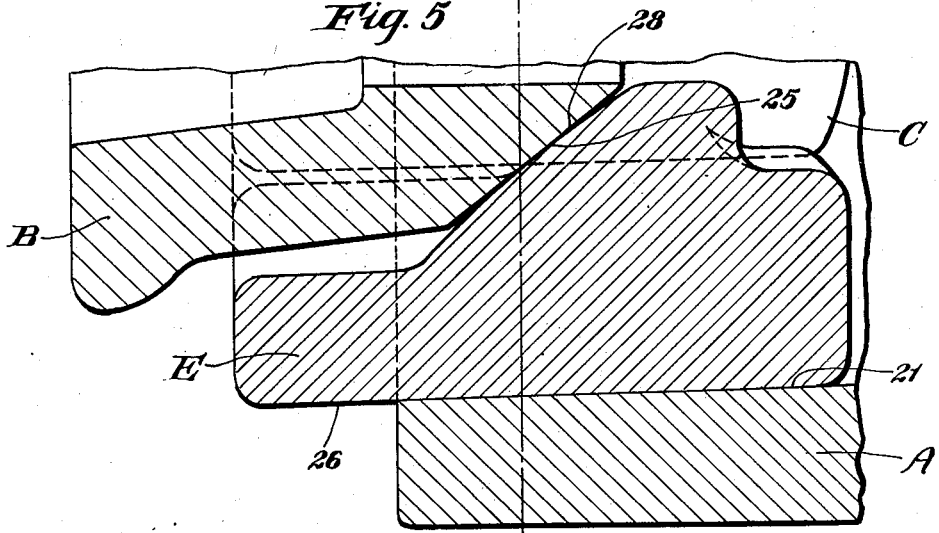

In the drawings forming a part of this specification, Figure 1 is a longitudinal sectional view of a portion of a railway draft rigging, illustrating my improved shock absorbing mechanism in connection therewith, the section through the friction casing and friction elements therewithin corresponding to two section planes at 120° apart. Figure 2 is an enlarged front elevational view of the shock absorbing mechanism shown in Figure 1, looking in the direction of the arrows 2—2. Figure 3 is a vertical transverse sectional view, corresponding substantially to the line 3—3 of Figure 1, on an enlarged scale. Figure 4 is a broken view, on a still further enlarged scale, corresponding to Figure 3 and showing more clearly the details of the structure, said view corresponding substantially to the line 4—4 of Figure 5. Figure 5 is a vertical sectional view, corresponding substantially to the line 5—5 of Figure 4. Figure 6 is a view, similar to Figure 4, illustrating another embodiment of the invention. Figure 7 is a rear elevational view of a modified form of wedge block. Figure 8 is a detailed perspective view of the wedge block illustrated in Figure 7.

In said drawings 10—10 denote the usual draft or center sills of a railway car underframe, said sills being preferably of channel cross section and to the inner faces of which are secured front stop lugs 11 and rear stop lugs 12 of usual construction. A portion of the drawbar is indicated at 13, the same having operatively associated therewith a hooded yoke 14 of well-known form, within which is disposed the shock absorbing mechanism proper, hereinafter described, and a front main follower 15. The yoke and the parts contained therein are supported in operative position by a detachable saddle plate 16 secured to the bottom flanges of the draft sills.

Referring first to the embodiment of the invention illustrated in Figures 1 to 5 inclusive, the improved shock absorbing mechanism proper, as shown, comprises a combined friction casing and spring cage casting A; a pressure transmitting wedge B; six friction shoes C—C, D—D, and E—E; a spring resistance F; and a retainer bolt G.

The casting A is of generally hexagonal cross sectional contour, having the friction shell section proper 17 formed at the open front end thereof. This casing provides a spring cage 18 rearwardly of the friction shell section, and at its rear end the casing A has an integral transverse wall 19 extended beyond the sides thereof, as clearly shown in Figures 1 and 2, and forming a rear follower member which cooperates with the stop lugs 12—12 in the usual manner. The protruding portions of the follower member 19 are suitably reenforced by webs 20—20 formed integral therewith and with the casing side walls. The friction shell proper 17 is of hexagonal interior cross section, as clearly shown in Figures 1, 2, and 3, and presents six substantially flat friction surfaces 21—21, extending lengthwise of the mechanism. The corners between adjacent surfaces 21—21 are preferably rounded, as indicated at 22. The surfaces 21—21 are converged inwardly of the casing on a relatively slight taper for a purpose hereinafter pointed out. As will be evident, the hexagonal design of casing presents, in effect, three V-shaped friction surfaces 121—121—121, each composed of two adjacent surfaces 21—21.

The wedge B, through which the pressure is transmitted, is in the form of a block having a front transverse bearing face 23 engaging the front follower 15. At its inner end, the wedge B is provided with a true wedge face 24 and two rearwardly inclined faces 25—25 disposed at blunter angles with respect to the longitudinal central axis of the mechanism than the face 24. All of the faces 24, 25, and 25 are disposed around the center or axis of the wedge, giving said wedge the appearance of a truncated, somewhat irregular triangular pyramid.

The friction shoes are arranged in pairs C—C, D—D, and E—E, each pair cooperating with one of the V-shaped friction surfaces 121 of the casing and having wedging engagement with one of the wedge faces of the block B. The shoes of each pair together form, in effect, a single friction member which is split into two relatively adjustable sections, and cooperates with one of the wedge faces of the block B and one of the V-shaped surfaces 121 of the casing A. The pairs of shoes C—C and E—E are of like construction. The shoes of each pair are complementary members. Each shoe of each pair C—C and E—E has an outer friction surface 26 adapted to engage one of the surfaces 21 of the casing. On the inner side, that is, the side nearest the longitudinal central axis of the casing, each shoe C and E is provided with a lateral enlargement 27 having an inclined face 28 thereon engaging with one of the wedge faces 25 of the block B and having substantially the same inclination as the face 25. The face 28 is curved both longitudinally and transversely, as clearly shown in the drawings, thereby providing a crowned surface on the shoe. This face 28 is preferably of spherical contour but it may be of any other suitable contour to present the crowned surface which will permit rocking adjustment of the shoe both longitudinally and transversely on the cooperating flat face 25.

The pair of shoes D—D is similar to the pairs of shoes C—C and E—E, except as hereinafter pointed out. Each shoe D is provided with an outer friction surface 26 and a lateral enlargement 27 on its inner side having an inclined wedge face, indicated by 29, cooperating with the wedge face 24 of the block B. The wedge face 29 is curved both longitudinally and transversely similarly to the face 28, but is inclined with respect to the longitudinal central axis of the mechanism to correspond with the inclination of the face 24 of the block B, that is, at a keener angle with respect to said longitudinal axis than the face 28, thus providing a true wedging angle to properly cooperate with the face 24. The shoes of each pair C—C, D—C, and E—E are in bearing engagement with each other on portions of adjacent side faces, which side faces are indicated by 30—30—30. These faces extend lengthwise of the mechanism and diverge with respect to each other laterally from the outer to the inner sides of said shoes. At the juncture of the face 30 with the outer friction surface 26, the corner of each shoe is rounded off, as indicated at 31, thereby providing a rounded bearing or fulcrum portion, which engages and rocks on the corresponding portion of the adjacent shoe, thus providing, in effect, swiveling engagement between adjacent shoes to facilitate rocking action of the shoes on each other. The relative inclination of the faces 30—30 of the adjacent shoes in such, and the portions 31—31 are rounded to such an extent that the clearance provided for the rocking action of the shoes of each pair with respect to each other is sufficient to allow the shoes to adjust themselves to the maximum distortion in contour of the friction casing permitted in commercial practice, and thus truly seat and interfit with the friction surfaces of said casing. In other words, the amount of clearance provided between the faces 30—30 of the adjacent shoes is made such that it will take care of deviations from the true angularity of the walls with respect to each other, which is characteristic of the usual commercial run of casings designed to be of regular hexagonal contour. The friction shoes will thus automatically adjust themselves to interfit with the friction surfaces of the casing even if these faces are at an angle to each other which is slightly more or less than 60°, the relative angularity of the sides of a true regular hexagon with respect to each other. In this connection it is pointed out that the crowned faces 28 and 29 are only slightly convex, being curved on arcs of relatively great radius, for a purpose hereinafter described.

The spring resistance F, as shown, comprises a heavy outer coil and a relatively lighter inner coil, both bearing at their front ends on the shoes and having their rear ends respectively in bearing engagement with the rear wall 19 of the casing and inwardly projecting hollow boss 132 on said rear wall.

The retainer bolt G is anchored at its rear end within the boss 132 and at its forward end within a suitable recess provided within the wedge block B. The retainer bolt not only serves to maintain the parts assembled, but is also utilized to adjust the parts to proper overall length, to maintain them in this position when under full release and to place the spring under initial compression.

When the parts of the mechanism are completely assembled, the wedge exerts a certain amount of pressure on the shoes, due to the initial compression under which the mechanism is placed, thereby pressing the shoes outwardly against the friction surfaces of the casing. Inasmuch as the shoes of each pair are under pressure and are mounted to rock with respect to each other and the wedge B, each shoe will be forced to seat squarely on the cooperating friction surface 21 of the casing, the necessary adjustment taking place on the cooperating faces 30—30 of adjacent shoes and on the crowns of the cooperating wedge faces of said shoes and the wedge.

The two shoes of each pair C—C, D—D, and E—E, together form, in effect, a single split friction member which has wedging engagement with one of the wedge faces of the wedge block B and fits into the angle formed by the V-shaped friction surface 121, composed of two adjacent friction surfaces 21—21 on the casing A. This fit is made possible by the adjustability of the sections of the friction member with respect to each other.

Assuming a buffing or compressing action applied to the draft rigging, the general operation of the mechanism is as follows, detailed consideration of the cooperating flat and crowned faces being omitted at this time: The front follower 15 will be forced rearwardly by the drawbar 13 while the casing A is held stationary by engagement of the rear follower 19 thereof with the rear stop plugs 12—12. In a draft action of the rigging, the casing A is pulled forwardly with the drawbar 13 by means of the yoke 14, thereby compressing the shock absorbing mechanism against the front follower 15, which at this time is held stationary by the front stop lugs 11—11. Thus, upon either buff or draft action of the mechanism, the wedge B is forced inwardly of the casing. As the wedge B is forced inwardly the pairs of shoes C—C, D—D, and E—E are spread apart and forced into tight frictional engagement with the friction surfaces of the casing, the wedging action being initiated and facilitated by the keen wedging action between the wedge B and the shoes D—D. At the same time, the shoes will be forced to slide inwardly along the friction surfaces of the casing opposed by the spring F. As the shoes move inwardly of the tapered casing, the clutch formed by the wedge B, and shoes C—C, D—D, and E—E will be forced to contract, thereby providing differential action on the cooperating wedge faces with corresponding augmentation of the frictional resistance afforded.

Upon removal of the actuating or compression force, the parts of the mechanism are all restored to the normal full release position shown in Figure 1 by the expansive action of the spring F, the blunt shoes of the blunt and keen angle arrangement serving to initiate the releasing action and forcing the wedge to be squeezed out from between the shoes. Outward movement of the parts is limited by the retainer bolt G which arrests movement of the wedge B. Release of the mechanism is greatly facilitated by the collapsible arrangement of each individual pair of shoes, relative rocking movement of the shoes on each other permitting each unit comprising a pair of shoes to contract thus automatically loosening the same from the cooperating V-shaped cross sectional friction surface and permitting the shoes to drop away from the walls of the casing as soon as the actuating pressure transmitted through the wedge is reduced. As will be evident to those skilled in this art, this easy releasing action permits much keener wedging angles to be employed between the wedge and shoes without any danger of sticking of the parts of the mechanism, thereby correspondingly increasing the shock absorbing capacity of the gear.

Referring now more specifically to the operation and functioning of the flat and convex surfaces of the pressure transmitting wedge and shoes: In commercial practice a variation of two degrees in taper of the casing friction surfaces and a similar slight variation in angularity between adjacent friction surfaces in a device of the kind disclosed is permitted. In carrying out my invention, the radius of curvature of each longitudinally and transversely convex surface 28 and 29 is made relatively long and of such a length that the degree of curvature will accommodate variations within the limits above referred to, both as to transverse interior cross sectional contour and longitudinal taper of the casing, the degree of longitudinal curvature accommodating within said limits variations in taper, and the degree of transverse curvature accommodating within said limits variations in relative angularity of the friction surfaces of the casing with respect to each other, the automatic adjustments for variations in taper and cross sectional contour being entirely independent of each other.

Referring first to the accommodation to variations in taper, the radius of curvature of each surface 28—29 lengthwise of said shoe is made of such a length that it will accommodate variations within two degrees in taper of the casing friction surfaces, that is, assuming the maximum variation in one direction, contact will be insured between the crowned shoe surface 28 or 29 and the cooperating flat wedge surface 25 or 24 near the inner ends thereof; assuming the limit of variation in the opposite direction, contact will be assured between the crowned surface 28 or 29 of the shoe and the flat cooperating surface 25 or 24 of the wedge near their outer ends; a casing formed with the friction surfaces tapered accurately as designed will insure contact midway between the inner and outer ends of the crowned surface 28 or 29 and the cooperating flat surface 25 or 24; and variations intermediate the points referred to will insure contact between the extreme limits.

Referring next to the accommodation to variations in transverse interior contour of the hexagonal casing, the radius of curvature of each shoe surface 28 or 29 transversely of said shoe is made of such a length that it will accommodate variations in angularity of the walls of the hexagonal casing with respect to each other to the extent of a few degrees from the normal 60° angle of a regular hexagon, that is, assuming the maximum variation in relative angularity in one direction, or an angularity of more than 60°, contact will be insured between the crowned surfaces 28 or 29 of the shoe and the cooperating flat surface 25 or 24 of the wedge at a point near the inner side edge of the shoe surface, that is, the edge nearest the face 30; assuming the limit of variation in the opposite direction, or an angularity of less than 60°, contact will be insured between the crowned surface 28 or 29 of the shoe and the cooperating flat surface 25 or 24 of the wedge at a point near the outer side edge of the shoe surface 28 or 29, that is, the edge remote from the face 30; a shell formed accurately of the contour of a regular hexagon as designed, contact between these surfaces is had at a point substantially midway between said inner and outer side edges of the crowned surface of the shoe; and variations intermediate the points referred to will insure contact between the extreme limits mentioned. The transversely and longitudinally crowned surfaces 28 and 29 of the shoes thus provide for universal adjustment to take care of variations in taper and transverse cross sectional contour of the casings and when the parts of the friction shock absorbing mechanism are assembled there will be, theoretically only, point contact between each set of surfaces 28 and 25 or 29 and 24, but as soon as the device has been compressed once this theoretical point contact will immediately be widened into a surface contact of appreciable width and as two or three or four additional compressions of the mechanism occur, the area of contact is correspondingly increased or widened until a sufficiently large enough area is obtained to insure proper functioning of the parts. This process of fitting of the parts to compensate for permissible foundry variations can obviously be accomplished in the usual drop-hammer test of the gear before being shipped and applied to the car. From the foregoing it will be observed that my improvements permit of automatic compensation of the parts even though variation in inclination of one casing surface 21 may be different from the variation found in any other surface 21, and the variation in angularity between any adjacent surfaces 21—21 may be different from the variation in angularity found between any other adjacent friction surfaces 21—21.

Referring next to the embodiment of the invention illustrated in Figure 6, the construction is substantially the same as that hereinbefore described with the exception that each wedge face of the wedge block is made up of two oppositely inclined sections. In Figure 6, the casing is also indicated by A, the wedge block by B, the shoes by E—E, the retainer bolt by G, the friction surfaces of the casing by 21—21, the crowned wedge faces of the shoes by 28—28, the diverging side faces of the shoes by 30—30, and the rounded corners of the shoes by 31—31. The wedge B, shown in Figure 6, is formed with three wedge faces, two of which may be disposed at relatively blunt angles and the remaining face of which may be disposed at a relatively keen wedging angle with respect to the longitudinal axis of the mechanism, similarly to the wedge B hereinbefore described in connection with Figures 1 to 5 inclusive. The blunt face which cooperates with the pair of blunt angle shoes E—E is shown in Figure 6 and is indicated by 33. The face 33, as shown, is composed of two flat surfaces 34—34, slightly inclined with respect to each other. The inclination of these surfaces 34—34 is laterally outwardly away from the longitudinal center line of said face 33, thus providing, in effect, a surface of depressed V-shaped cross section. Due to the relative inclination of the surfaces 34—34, the forces exerted during wedging action of the wedge member B tend to force the shoes E—E laterally inwardly toward each other or toward the corner of the V-shaped friction surface 121 of the casing A, which V-shaped surface is defined by the two adjacent friction surfaces 21—21 shown in Figure 6. As will be understood, the remaining wedge faces of the wedge block shown in Figure 6 are also formed of V-shaped transverse cross section, similarly to the face 33.

Referring next to the structure illustrated in Figures 7 and 8, which shows a different form of wedge block, the wedge block which is indicated by K is made of hexagonal cross section, instead of circular cross section as the block B. The wedge block K is otherwise in all respects similar to the block B and functions in the same manner. By making the wedge block K of hexagonal cross section, it fits more precisely the haxagonal space between the shoes of the gear, thus making it possible to increase the area of the wedge faces, which is desirable in a device of this character to obtain maximum bearing area of the wedge faces of the wedge block on the wedge faces of the shoes.

While I have herein shown and described the crowned surfaces as being provided on the friction shoes, it will be obvious that similar results can be obtained by placing the crowned surfaces on the pressure transmitting wedge, instead of on the shoes, or by dividing the crown between said surfaces, that is, crowning both of said surfaces, but each to a lesser extent.

I have herein shown and described what I now consider the preferred manner of carrying out my invention, but the same is merely illustrative and I contemplate all changes and modifications that come within the scope of the claims appended hereto.

I claim:

1. In a friction shock absorbing mechanism, the combination with a friction casing having a pair of longitudinally extending, laterally inwardly diverging friction surfaces; of a pair of mutually adjacent friction shoes, one of said shoes being fulcrumed on the other for relative lateral rocking movement with respect to each other about axes extending lengthwise of the casing, said shoes having sliding engagement respectively with said friction surfaces lengthwise of the casing; a pressure transmitting member movable lengthwise of the casing and having a wedge face extending in a direction lengthwise of the casing in wedging engagement with both shoes, said shoes having wedge faces extending lengthwise of the casing on which said wedge faces of the pressure transmitting member bear, said wedge faces of the shoes being transversely crowned; and means yieldingly opposing movement of the shoes lengthwise of the casing.

2. In a friction shock absorbing mechanism, the combination with a friction casing having a pair of longitudinally extending, laterally inwardly diverging flat interior friction surfaces; of a pair of friction shoes having flat friction surfaces on the outer sides thereof, respectively arranged for sliding frictional engagement with said friction surfaces of the casing, each shoe having on its inner side a face inclined lengthwise of the shell away from said friction surfaces, each of said inclined faces being crowned lengthwise and crosswise; a member through which the actuating force is transmitted to said shoes and having a corresponding face contacting both of said shoe faces, and said shoes being fulcrumed on each other for rocking adjustment with respect to each other about axes extending lengthwise of the mechanism; and means yieldingly opposing sliding movement of said shoes inwardly of the casing.

3. In a friction shock absorbing mechanism, the combination with a friction casing having a pair of interior longitudinally extending, laterally inwardly diverging flat friction surfaces; of a pair of adjacent friction shoes, one shoe of said pair being in flat sliding frictional engagement with one of said friction surfaces of said pair, and the other shoe of said pair being in flat sliding engagement with the other friction surface of said pair, said shoes having opposed adjacent side faces disposed lengthwise of the mechanism and extending laterally outwardly away from the central portion of the mechanism, said faces having interengaging fulcrum portions near their lateral outer ends, said faces diverging inwardly from said engaging fulcrum portions; each shoe having a face on the inner side thereof inclined with respect to said friction surfaces inwardly toward the longitudinal axis of said casing; a wedge pressure transmitting member having a wedge face correspondingly inclined to said shoe faces, each shoe face having contact with the face of said wedge, the contacting portions of said shoe and wedge faces being relatively crowned transversely of the mechanism; and means yieldingly opposing movement of said shoes lengthwise of the casing.

4. In a friction shock absorbing mechanism, the combination with a friction casing having a pair of interior longitudinally extending, laterally inwardly diverging flat friction surfaces; of a longitudinally displaceable wedge pressure transmitting member; a pair of friction shoes interposed between said wedge member and casing friction surfaces, said shoes being arranged side by side and having flat sliding frictional contact with said casing surfaces respectively, said shoes being provided with contacting fulcrum portions on their contiguous sides mounting said shoes for rocking adjustment with respect to each other about axes extending lengthwise of the casing, said wedge and each shoe having cooperating engaging sets of wedge face portions inclined inwardly away from said friction surfaces, one of the wedge face portions of each set being crowned transversely; and means yieldingly opposing movement of said shoes lengthwise of the casing.

5. In a friction shock absorbing mechanism, the combination with a column member having a longitudinally extending friction surface of V-shaped transverse cross section; of a two-part split friction member fitting said V-shaped friction surface, said member being split in directions lengthwise and radial of the column member and the parts thereof being in fulcruming engagement with each other for rocking displacement about axes extending lengthwise of the mechanism; a pressure transmitting member movable lengthwise of the casing and having wedging engagement with both parts of the friction member on surfaces which are rounded transversely with respect to each other; and means yieldingly opposing longitudinal movement of said members with respect to each other.

6. In a friction shock absorbing mechanism, the combination with a friction casing of angular, interior cross section presenting a plurality of pairs of longitudinally extending, laterally inwardly diverging, interior friction surfaces; of a pair of friction shoes cooperating with each pair of friction surfaces, the shoes of said pair being arranged side by side in contact with each other on fulcrum portions provided on said sides between the lateral ends of said sides, said shoes of said pair having sliding frictional engagement respectively with the surfaces of the corresponding pair of the casing; a wedge member having a plurality of wedge faces, said wedge faces corresponding in number to the number of pairs of shoes, each of said shoes having a wedge face, and the wedge faces of each pair of shoes being engaged by one of said wedge faces of the wedge and having curved bearing engagement therewith; and means yieldingly opposing relative sliding movement of said shoes and casing.

7. In a friction shock absorbing mechanism, the combination with a friction casing of hexagonal, interior cross section presenting six flat interior friction surfaces; of six friction shoes having sliding engagement with said friction surfaces respectively lengthwise of the casing, said shoes being arranged in three sets of adjacent shoes of two shoes each, said adjacent shoes of each set having fulcrum portions in engagement with each other to mount said shoes for relative rocking adjustment about axes extending lengthwise of the casing, each shoe having a wedge face; a wedge block having three wedge faces cooperating respectively with said three sets of shoes, each wedge face of said block engaging the wedge faces of both shoes of the corresponding set, the cooperating wedge face portions of said wedge and each of said shoes being in engagement with each other, at least one of said last named face portions being crowned transversely to provide for slight relative rocking movement of said shoes with respect to the wedge; and means yieldingly opposing movement of said shoes inwardly of the casing.

8. In a friction shock absorbing mechanism, the combination with a hexagonal casing presenting three interior, longitudinally extending friction surfaces, each of said surfaces being of V-shaped transverse cross section; of a central wedge block; three friction members surrounding said block and interfitting respectively with the three V-shaped friction surfaces of the casing, each of said friction members being split in a direction radial to the longitudinal axis of the mechanism throughout the length of said member into two sections, said sections having fulcruming rocking engagement with each other at a point between the lateral ends of the opposed faces of said sections, each section having a wedge face thereon, said wedge block having three sets of wedge faces, each set comprising two laterally diverging faces engaging respectively the wedge faces of the sections of one of said friction members, the wedge faces of each section of the friction member being in engagement with the corresponding wedge face of said wedge, one of said engaging faces being crowned in crosswise direction; and means yieldingly opposing movement of said friction members inwardly of the casing.

ROLAND J. OLANDER.